(12) United States Patent
Sato et al.

(10) Patent No.: US 6,724,201 B2
(45) Date of Patent: Apr. 20, 2004

(54) RESISTANCE TYPE LIQUID LEVEL MEASURING APPARATUS

(75) Inventors: Koichi Sato, Nagaoka (JP); Kiyoshi Enomoto, Nagaoka (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 10/089,144

(22) PCT Filed: Jul. 18, 2001

(86) PCT No.: PCT/JP01/06255
§ 371 (c)(1),
(2), (4) Date: Mar. 27, 2002

(87) PCT Pub. No.: WO02/14806
PCT Pub. Date: Feb. 21, 2002

(65) Prior Publication Data
US 2002/0149380 A1 Oct. 17, 2002

(30) Foreign Application Priority Data

Jul. 31, 2000 (JP) ........................ 2000-235267
Jun. 21, 2001 (JP) ........................ 2001-188296

(51) Int. Cl.⁷ ............................................. G01B 27/08
(52) U.S. Cl. ..................... 324/714; 324/699; 324/713; 324/723; 324/716
(58) Field of Search ............................... 324/699, 714, 324/713, 723, 716; 73/305, 304, 290 R (56) References Cited

U.S. PATENT DOCUMENTS 5,826,459 A * 10/1998 Kataoka et al. ........... 73/290 R
6,212,950 B1 * 4/2001 Cooper et al. .............. 73/313

FOREIGN PATENT DOCUMENTS

| JP | 60-23709 | 7/1989 |
| JP | 6-16824 | 3/1994 |
| JP | 2000-136956 A | 5/2000 |

* cited by examiner

Primary Examiner—Albert Decady
Assistant Examiner—James Kerveros
(74) Attorney, Agent, or Firm—McDermott, Will & Emery (57) ABSTRACT

A resistance-type liquid level measuring apparatus which suppresses a detection voltage error due to silver sulfide within a permissible range in practical use and enables measurement indication with accuracy, and comprises a resistance-type sensor including a float 9 floating according to a liquid level, an insulating substrate 6 having a plurality of conductor electrodes 4 connected with a resistor 5, and a movable contact interlocked with a movement of the float 9 to come in contact with the conductor electrodes 4 on the insulating substrate 6, in which a material containing silver is used as a material of the conductor electrodes 4 or the movable contact, a voltage dividing resistance 11 is connected with a power source BA in series with the resistor 5, and a voltage of a connection point between the voltage dividing resistance 11 and the resistor 5 is outputted as a signal corresponding to the liquid level, and resistance values of the voltage dividing resistance 11 and the resistor 5 are set so that a voltage drop VS due to silver sulfide generated between the conductor electrode 4 and the movable contact becomes 15% or less, preferably 10% or less with respect to a difference between a voltage VF equivalent to a full tank of the liquid level and a voltage VE equivalent to a low region.

14 Claims, 6 Drawing Sheets

RESISTANCE TYPE LIQUID LEVEL MEASURING APPARATUS

TECHNICAL FIELD

The present invention relates to a resistance-type liquid level measuring apparatus installed in a fuel tank, for detecting a liquid level by a resistance value of a resistor corresponding to a contact position of a movable contact interlocked with a float floating on the surface of a liquid.

BACKGROUND ART

In a vehicle traveling by a fuel such as gasoline or methanol, a fuel tank for containing the fuel is mounted, and an engine is driven by fuel supply from this. A fuel gauge indicating the residual quantity of such fuel is installed in a dashboard in front of a driving seat, and a driver confirms this to judge lack of fuel and carries out refueling.

As a fuel gauge for indicating the residual quantity of fuel in a fuel tank as stated above, a cross coil-type instrument using a pointer for indication, a stepping motor-type instrument, a liquid crystal indicator using a bar graph or a digital numerical value for indication, a fluorescent display tube, or the like is used. As a detector for detecting the residual quantity of fuel in a tank, a liquid level sensor is generally known in which a resistance-type sensor, which has a simple structure and is inexpensively constructed, is installed in a fuel tank, and a driver in a driving seat can always confirm the fuel residual quantity indicated by this fuel gauge during the driving, and can judge the necessity of refueling according to a distance to a destination.

In the detection of a fuel residual quantity by a fuel gauge made of such a resistance-type sensor, a movable contact is angularly rotated by an arm coupled with a float floating according to a liquid level, or a contact position is vertically moved by a contact fixed to a ring float, and a resistance value corresponding to the liquid level is obtained through a voltage at a connection position to many conductor electrodes connected with a resistor on an insulating substrate. However, since the position of the contact is changed in a state where it is immersed in the fuel such as gasoline or methanol, and since an electric current is applied to the contact portion, there is a possibility that a problem of contact abrasion or contact fault arises at the contact portion, and it has been improved by the improvement of a contact material. As disclosed in, for example, Japanese Utility Model Publication No. Hei. 4-1682, it is known that such a conductor electrode is made of a mixture of AgPd (silver palladium) powder and glass, and is obtained by mixing Ag (silver) powder, palladium (Pd) powder, and glass powder to form a paste, printing it on an insulating substrate, drying this, and then, firing. Ag (silver) has a low electric resistance and is excellent in conductivity, however, when used in a fuel, it is degraded or corroded by, for example, sulfur, moisture, alcohol, or the like in the fuel, and causes defective continuity.

Especially in a fuel such as bad gasoline, an Ag (silver) component of an electrode or a contact is sulfurized by sulfur in the fuel, and silver sulfide is deposited on the electrode or the contact surface, so that electric resistance between contacts is increased to influence an electric current flowing between the contacts. In a detection system of voltage dividing specification as disclosed in, for example, Japanese Utility Model Publication No. Sho. 60-23709, in which a movable contact is grounded or this movable contact is used as an output terminal, an actual divided voltage by a movable contact of a variable resistor can not be obtained by the influence of the resistance between contacts due to such sulfide, and there is such a problem that an error is produced in the indication of a fuel quantity as a fuel gauge. That is, from an E point (low region: empty side) at which a resistance value is at a maximum position to an F point (full tank: full side) corresponding to a minimum position, especially at the F point, electric resistance between contacts is influenced by silver sulfide, and there occurs such a phenomenon that the indication of the fuel gauge does not accurately indicate the F point though full tank refueling is carried out.

By such phenomenon, in a pointer-type instrument, a rather lower side from the F point scale position of a dial is indicated, and in a bar display by a plurality of segments in an electronic indicator such as a liquid crystal indicator, a segment corresponding to the F point does not operate, and segments at the lower side are displayed, so that the indication lacking reliability is produced such that in spite of a full tank, the F point is not indicated. A similar minus indication phenomenon occurs also at the E point side of the low region, however, in this case, the E point is indicated even if some fuel remains, and accordingly, such a situation as running out of gas does not occur and there is no problem in practical use. However, there arise a problem that a distrust is produced at refueling if the indication remains minus at the F point.

Further, such a phenomenon also occurs in a structure used for, for example, a fuel tank of a motorcycle, in which a main tank and a sub-tank are provided, resistance-type sensors are respectively installed in the tanks, and these resistance-type sensors are connected in series with each other to obtain the sum of residual quantities of fuel in both the tanks, and an indication error by the increase of contact resistance due to silver sulfide has a greater influence as the sum of the two resistance-type sensors.

In order to elucidate the mechanism of silver sulfide generation as stated above, the present inventor prepared many resistance-type sensors, immersed them in a liquid containing sulfur, measured a voltage between contacts due to generation of silver sulfide, that is, a voltage drop generated by deposited silver sulfide, and investigated and studied the influence exerted on the indication of a fuel gauge. In the resistance-type sensors of experimental objects, a conductor electrode material contained AgPd and a contact material was an alloy containing CuNi (copper nickel) as its main ingredient, or an alloy containing CuNiZn (copper nickel zinc) as its main ingredient or an alloy containing it. A change of a voltage drop VS between contact points due to the deposition of silver sulfide was measured under the conditions of a power supply voltage V=5 v, a resistance value of a voltage dividing resistance RO=120 Ω, and as a resistance value of a resistor R1, 130 Ω at the E point position to 13 Ω at the F point position. As a result, a phenomenon with saturated voltage occurred in which although the voltage drop VS was gradually increased with the degree of deposition of silver sulfide, a further increase was not seen at approximately 0.4 v to 0.6 v. Further, in order to confirm such phenomenon, experiments were repeated in which the deposition of silver sulfide was advanced and the power supply voltage V was changed. As a result, it was found that the voltage became constant at approximately 0.4 v to 0.6 v, and a further increase did not occur. This is because a current application mechanism through silver sulfide deposited on the electrode surface operates as a semiconductor to cause a function just like a diode, and it appears that a constant voltage drop phenomenon of 0.4 v occurs irrespective of the quantity of the deposition and irrespective of the magnitude of the power supply voltage. Incidentally, even if AgPd (silver palladium) alloy, AgCu (silver copper) alloy, AgNi (silver nickel) alloy or the like is used as the contact material, the voltage drop VS to the deposition of silver sulfide becomes also about 0.4 v by the same function.

With respect to such voltage drop VS=0.4 v, in the case where a detection voltage VO is obtained at a connection point between a voltage dividing resistance RO and a resistor R1 under a power supply voltage V=5 v, the detection voltage is VO=(5−0.4)×R1/(RO+R1)+0.4, and when a voltage equivalent to a full tank of a liquid level is VF, and a voltage equivalent to a low region is VE, VF=(5−0.4)× 13/(120+13)+0.4=0.85 v, and VE=(5−0.4)×130/(120+130)+ 0.4 =2.79 v. A change width corresponding to an indication range of such detection voltage VO becomes about 2 v, and if the change of 2 v is converted and indicated within the range of from the F point to the E point of the scale of an indicating instrument, an error of the voltage drop VS=0.4 v due to silver sulfide reaches 25% of the whole indication angle. With respect to the output voltage in a normal state where the voltage drop VS by the increase of contact resistance due to silver sulfide is hardly generated, from the output voltage VF=5×13/(120+13)=0.49 v equivalent to the full tank to the output voltage VE=5×130/(120+130)=2.6 v corresponding to the low region, especially at the time of the full tank, the indication is greatly shifted to the side of the E point from the F point by the voltage drop of 0.4 v, and becomes impermissible as an indication error on the scale. For example, there is a problem that although a full tank is caused at the time of refueling, the indication position is much lower than the F point.

The present inventor paid attention to such a voltage drop phenomenon due to silver sulfide, and changed an approach in such a direction that a conductor electrode material was not changed or transformed as a measure of suppressing the generation of silver sulfide, or a material measure was suppressed to the minimum, and the generation phenomenon of silver sulfide as stated above was accepted, however, if the influence of the voltage drop phenomenon on the indication of a fuel gauge was suppressed to such a degree that it could be neglected in practical use, a resistance-type sensor as stated above, which was used as a set including an indicating instrument, became satisfactory. Besides, an improvement was made under the thought that if the voltage indication error by the voltage drop, such as 0.4 v, due to silver sulfide at the F point, where a practical influence was highest, was suppressed, a practical problem could be resolved.

DISCLOSURE OF THE INVENTION

A resistance-type liquid level measuring apparatus in the present invention is provided on an attachment plate 3 attached to an opening of a fuel tank 2, and is constructed, at a lower side of the attachment plate 3, as a resistance-type sensor 1 constituted by an insulating substrate 6 made of ceramic on which a conductor electrode 4 made of an alloy containing silver, for example, AgPd (silver palladium) alloy and a resistor 5 are formed by printing, and a slider 8 (movable contact) provided with a contact portion 7 which slides on the conductor electrode 4. The conductor electrode 4 is made of plural lines of electrode patterns (a plurality of conductor electrodes 4) arranged in a fan shape (substantially parallel) along a rotation trajectory of the contact portion 7 and at suitable intervals on the insulating substrate 6, and the resistor 5 is made by firing a printed layer containing, for example, ruthenium oxide as its main ingredient, and is adhered so as to continuously cover a part of each of the plural lines of the electrode patterns constituting the conductor electrode 4.

The vertical movement of a liquid level is transmitted to the slider 8 through a float 9 and an arm 10, the contact portion 7 slides on the conductor electrode 4 so that the conductor electrode 4 on the insulating substrate 6 comes in contact with the contact portion 7, a resistance value of an effective resistor between a position of the contacted conductor electrode 4 and one end side is changed, and a value of a current flowing between the contact portion 7 and the conductor electrode 4 is determined. The change of this current value is outputted as a detection signal of a voltage value through an output terminal. Here, resistance values of the respective resistors are set such that a resistance value RO of a voltage dividing resistance 11 is RO=420 Ω, a resistance value RE of the resistor 5 at the time when the liquid level is at a low region is RE=447 Ω, and a resistance value RF at the time of a full tank is RF=13 Ω. A power supply voltage V at this time is 10 v.

By this, when the resistance-type sensor 1 is used in a fuel containing sulfur, relative to a voltage drop VS=0.4 v due to silver sulfide deposited between the slider 8 (movable contact) and the conductor electrode 4, when a detection voltage VO equivalent to a full tank of a liquid level is VF, and a voltage equivalent to a low region is VE, a voltage output of |VF−VE|>4 v (volt) is obtained, and the voltage drop VS generated by silver sulfide becomes 15% or less of the detection voltage VO, and can be suppressed to be sufficiently low as an indication error.

Besides, as another embodiment of the resistance-type sensor 1, among the respective conductor electrodes P of the electrode patterns arranged in the fan shape and substantially parallel with each other to constitute the conductor electrode 4 on the insulating substrate 6, a resistance value of the resistor 5 positioned between a conductor electrode PF corresponding to the F point equivalent to the full tank of the liquid level and a lower side conductor electrode P1 adjacent thereto is set to be larger than a resistance value between other conductor electrodes P positioned at the lower side, the sum of voltage differences ΔVF respectively between detection voltages VF and V1 at the connection point when the movable contact 8 comes in contact with the conductor electrode PF and the conductor electrode P1 is 0.4 v (volt) or larger, and the indication characteristic at an indication unit 102 is made such that the F point is indicated until a voltage becomes one obtained by adding 0.4 v (volt) or larger to the detection voltage VO at the conductor electrode PF when sulfurization does not occur, whereby with respect to the indication at least at the F point position, even if the voltage drop due to silver sulfide is generated, it is not indicated as an error, and such a disadvantage that the F point is not indicated is resolved though a full tank state is caused by refueling.

Further, in addition to the error absorption structure at the F point, if the foregoing structure is also used in which when the detected voltage VO equivalent to the full tank of the liquid level is made VF and the voltage equivalent to the low region is made VE, the voltage output of |VF−VE|>4 v (volt) is obtained so that the voltage drop VS generated by silver sulfide becomes 15% or less of the detection voltage VO, the error at the F point is absorbed, and an indication error in the whole indication region can also be suppressed to be sufficiently low in practical use.

BEST MODE FOR CARRYING OUT THE INVENTION

Figure 1:
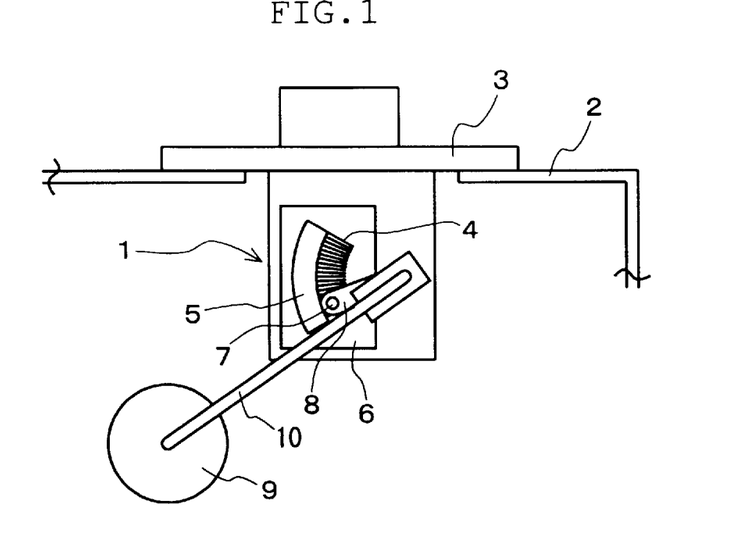
FIG. 1 is a front view of a liquid surface detecting apparatus according to a first embodiment of the present invention.

In FIG. 1, a resistance-type sensor 1 as a resistance-type liquid level measuring apparatus is contained in a fuel tank 2, and is provided on an attachment plate 3 attached to an opening of the fuel tank 2. A detecting unit is attached to the lower side of the attachment 3, which includes an insulating substrate 6 made of ceramic on which a conductor electrode 4 and a resistor 5 are formed by printing, and a slider 8 provided with a contact portion 7 which slides on the conductor electrode 4.

Figure 2:
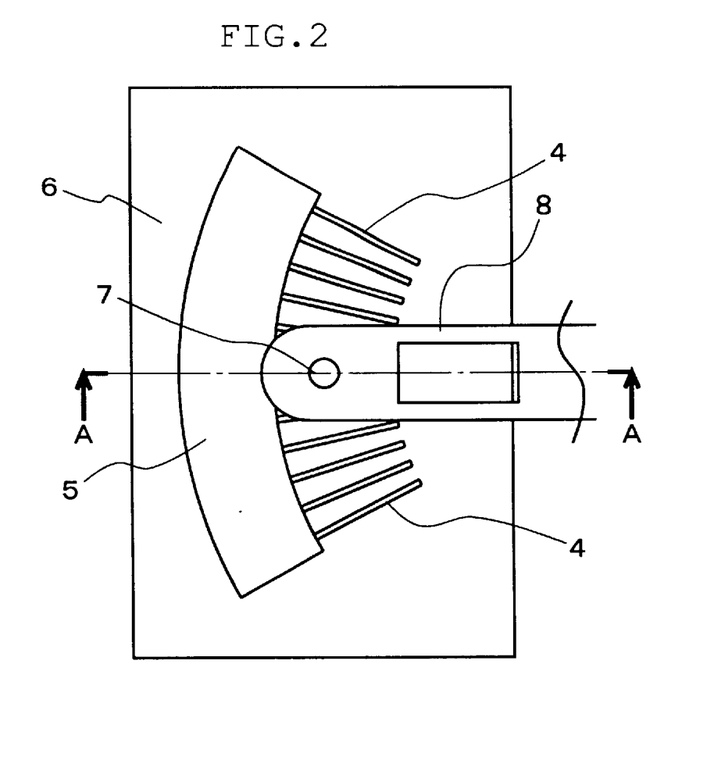
FIG. 2 is a front enlarged view showing the main portion of FIG. 1.

Also as shown in FIG. 2, the conductor electrode 4 is formed of plural lines of electrode patterns arranged in a fan shape along a rotation trajectory of the contact portion 7 and at suitable intervals on the insulating substrate 6.

The resistor 5 is formed by firing a printed layer containing, for example, ruthenium oxide as its main ingredient, and as shown in FIG. 2, it is adhered so as to continuously cover a part of each of the plural lines of the electrode patterns constituting the conductor electrode 4.

Figure 3:
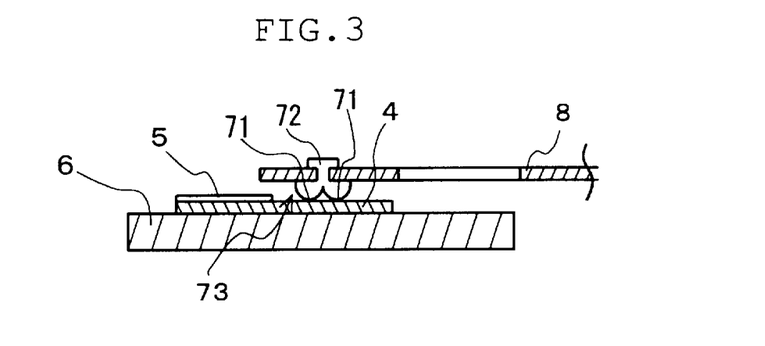
FIG. 3 is a sectional view taking along the line A—A in FIG. 2.
Figure 4:
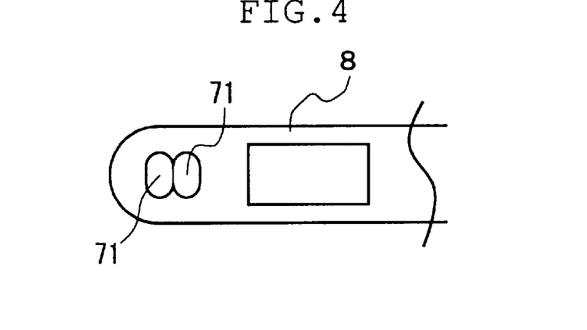
FIG. 4 is a front view showing a back side of a slider in FIG. 2.

Also as shown in FIGS. 3 and 4, the contact portion 7 is formed of a contact member 73 including a sliding portion 71 as a sliding contact portion to the conductor electrode 4 and a caulked portion 72 at a side opposite to the sliding portion 71, and is caulked and fixed to the slider 8 as a movable contact.

The slider 8 is made of a metal plate having a spring property, for example, a metal plate made of phosphor bronze, and is supported and fixed so as to be moved according to a movable part formed of a float 9, which is vertically moved in accordance with a liquid surface of a fuel, and an arm 10, and is supported and fixed with respect to the insulating substrate 6 so that the contact portion 7 attached and fixed to that can be moved on the insulating substrate 6 according to the liquid surface.

Figure 5:
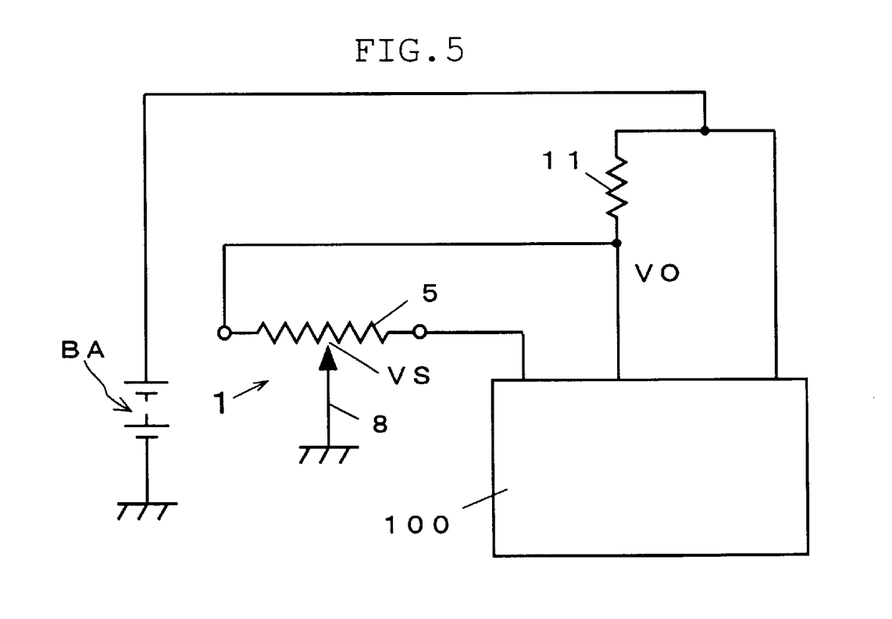
FIG. 5 is a circuit connection view of the liquid level measuring apparatus of the present invention.

By this, the vertical movement of the liquid surface is propagated to the slider 8 through the float 9 and the arm 10, the contact portion 7 slides on the conductor electrode 4 so that the conductor electrode 4 on the insulating substrate 6 comes in contact with the contact portion 7, a resistance value of an effective resistor between the position of the contacted conductor electrode 4 and one end side is changed, and a value of a current flowing between the contact portion 7 and the conductor electrode 4 is determined. The change of the current value is outputted as a detection signal of a voltage output through an output terminal, and FIG. 5 shows a circuit connection example in which the resistance-type sensor 1 forming the resistance-type liquid level measuring apparatus as stated above is used.

The resistance-type sensor 1 as the resistance-type liquid level measuring apparatus attached to a predetermined position in a fuel tank for a vehicle includes the movable contact 8 (slider) which is coupled with the float arm floating on the liquid surface in the fuel tank and is rotated, and is constructed such that a number of conductor electrodes 4 are formed in parallel with each other on, for example, the ceramic insulating substrate 6, the resistor 5 formed by printing a resistive material so as to have the same resistance value between both ends is provided thereon, and the movable contact 8 slides on the conductor electrodes 4. The movable contact 8 is connected to the minus side of an on-vehicle power source BA, the resistor 5 is connected in series with a voltage dividing resistance 11 from the positive side of the power source BA, and a detection voltage VO at a connection point between the voltage dividing resistance 11 and the resistor 5 is made a detection output.

A power supply voltage Vat this time is 10 to 16 v (volt), here, 10 v, a resistance value RO of the voltage dividing resistance 11 is 300 Ω or larger, here, 420 Ω, a resistance value RE of the resistor 5 at the time equivalent to the low region of the liquid level is 300 Ω or larger, here, 447 Ω, and a resistance value RF at the time equivalent to a full tank is RE×0.1, here, 13 Ω. By this, under the power supply voltage V=10 v, when a voltage at the connection point between the resistance value RO of the voltage dividing resistance 11 and the resistance value R1 of the resistor 5 is obtained as the detection voltage VO, the detection voltage is made VO= (10−0.4)×R1/(RO+R1)+0.4, and when the voltage equivalent to the full tank of the liquid level is made VF and the voltage equivalent to the low region is made VE, VF=(10−0.4)×13/(420+13)+0.4=0.69 v, and VE=(10−0.4)×447/(420+447)+0.4 =5.35 v. In the voltage VO, when the voltage equivalent to the full tank of the liquid level is VF, and the voltage equivalent to the low region is VE, the change width |VF−VE| of the output voltages of the E point and the F point becomes larger than 4 v (volt). The error of the voltage drop VS=0.4 v due to silver sulfide becomes 10% or less with respect to a deflection angle between the E point and the F point, and as compared with the conventional indication including an error of 25% as in the prior art, a great improvement in precision is obtained, and the error can be suppressed within an almost permissible range in practical use.

Figure 6:
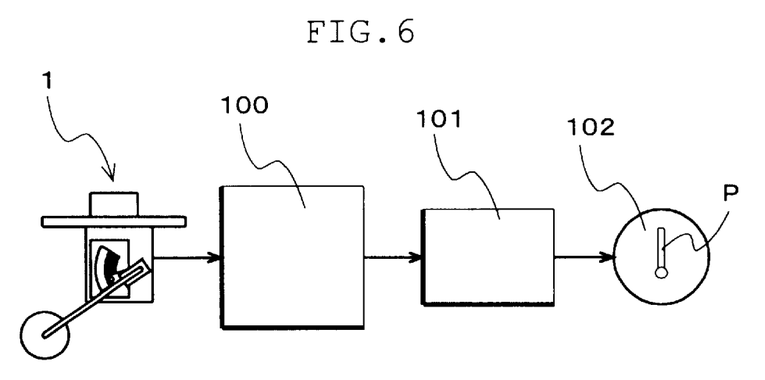
FIG. 6 is a block diagram showing an example of a display system of the liquid level measuring apparatus of the present invention.

That is, a structure in which indication is made by an indicating instrument on the basis of the thus detected signal, will be described with reference to FIG. 6. Reference numeral 100 designates a microcomputer as an operation unit; 101, a driving driver for making a predetermined voltage output in accordance with an instruction signal of the microcomputer 100; and 102, a display unit made of, for example, a cross coil-type instrument for angularly moving a pointer P in accordance with the driving voltage output from the driving driver 101. A detection signal of the resistance-type sensor 1 is converted into a driving signal corresponding to a liquid quantity through the microcomputer 100 and the driving driver 101, and the pointer P of the indication unit 102 is rotated by a predetermined angle on the basis of this driving signal to display the liquid quantity in the fuel tank 2. Incidentally, although not shown, the microcomputer 100 is generally designed with voltage driving of, for example, 5 v through a constant voltage source from the power source BA, and it is desirable that as its input voltage, the detection voltage VO of the connection point between the voltage dividing resistance 11 and the resistor 5 is made to have a change width of 5 v or less. Besides, in FIG. 5, one end of the resistor 5 is connected to the voltage dividing resistance 11, and the other end is connected to the microcomputer 100, however, this is connected to a ground terminal common to the microcomputer 100, and actually, the other end may be put in an open state without being connected.

In such structure, the detection voltage VO corresponding to the liquid level detected by the resistance-type sensor 1 is converted by the microcomputer 100 in such a manner that when the voltage equivalent to the full tank of the liquid level is VF and the voltage equivalent to the low region is VE, the change width of the output voltages of the F point and the E point, VF and VE are correspondingly indicated with indication angles of the F point and the E point on the scale of the display unit 102, respectively. Since this output voltage width becomes 4 v or larger, with respect to the indication angles of the F point and the E point corresponding to the width of 4 v; the error voltage due to silver sulfide is 0.4 v and the angle error is 10% or lower. Thus, a large influence disappears in practical use, and it becomes unnecessary to take troublesome and expensive measures, such as a change of electrode materials, for preventing the generation of silver sulfide itself.

Besides, the above resistance values are adopted, and further, when a current flowing to the movable contact at the time equivalent to the full tank of the liquid level at the movable contact position is made IF, and a current flowing at the time equivalent to the low region is made IE, empirically, if the current values are not made high but are made IF=<40 mA and IE=<40 mA, the cause of heat generation or the like in the respective resistors and contact portions of such structure can be suppressed excellently. According to the foregoing structure, when the power supply voltage is 10 v, the current becomes 10 v/(420+13) Ω=23 mA to 10 v/(420+447) Ω=12 mA, and even when the power supply voltage is 16 v, the current becomes 37 mA to 18 mA according to a similar expression, and the current value can be sufficiently decreased. Also with respect to the detection voltage VO at a power supply voltage of 16 v, a voltage difference between VF and VE, that is, the width of the detection voltage corresponding to the indication angle becomes larger than that at the voltage of 10 v, so that the voltage drop VS=0.4 v due to silver sulfide also becomes a smaller error, and indication without trouble in practical use becomes possible.

Also with respect to a voltage drop of 0.6 v due to silver sulfide which rarely occurs experimentally in a state of immersion in gasoline for an extremely long time, in the conventional structure, an error of approximately 30% occurs with respect to a deflection angle, however, with respective to the voltage width of 4 v or larger in the present invention, it can be suppressed to 15%, and indication having an error within a permissible range according to use and application becomes possible.

Here, the resistance value RO of the voltage dividing resistance 11 is made 300 Ω or larger and the resistance value RE of the resistor 5 at the time equivalent to the low range is made 300 Ω or larger, since the increase of the current value under the power supply voltage of 10 v can be prevented as described above, and the detection voltage VO becomes 5 v or less and is suitable for detection by the microcomputer 100 at the subsequent stage. Even when the resistance values are set so that the detection voltage VO becomes 5 v or larger, if a voltage converting circuit such as a voltage dividing resistance intervenes between the resistor and the microcomputer 100, the influence of the voltage drop of 0.4 v due to silver sulfide can be suppressed to be less. For example, in the case where a current value may be increased to some extent without paying attention to heat generation of the resistor or the circuit, even when the resistance value RO Of the voltage dividing resistance 11 is made 100 Ω, the resistance value RE of the resistor 5 equivalent to the low region is made 1000 Ω, and the resistance value RE equivalent to the full tank is made 50 Ω, the detection can be made with the voltage width of about 6 v from the F point detection voltage VF=10 v×50/(100+50) Ω=3.3 v under the power supply voltage of 10 v to the E point detection output VE=10 v×1000/(100+1000)=9.1 v equivalent to the low region, so that the voltage drop VS=0.4 to 0.6 v due to silver sulfide can also be suppressed to an indication error of about 10% which is not problematic in practical use.

As stated above, the resistance values of the voltage dividing resistance and the resistor in the embodiment are set to be experimentally excellent in relation to the power supply voltage of a standard power source mounted in a vehicle, however, they may be set to values at which the voltage drop due to silver sulfide can be suppressed to 15% or less, preferably 10% or less with respect to the width between the detection voltages VF and VE according to the magnitude of the power supply voltage, and the magnitude is not particularly limited. Besides, although the embodiment has the structure in which the arm is coupled with the float, even in a liquid level measuring apparatus of a structure in which a long insulating substrate is vertically suspended in a tank, and a ring float with a movable contact is made to float around that, a similar effect can be obtained by similarly setting resistance values.

Figure 7:
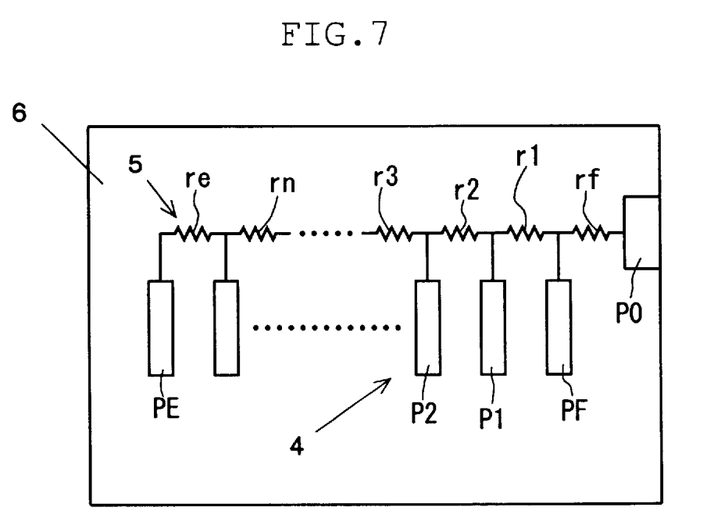
FIG. 7 is a structural view of a resistance-type sensor showing another embodiment of a liquid level measuring apparatus of the present invention.

FIG. 7 shows another embodiment of the present invention, and the basic structure of a resistance-type sensor 1 is the same as the foregoing embodiment shown in FIGS. 1 to 5. However, for the purpose of explaining resistance values, conductor electrodes 4 and resistance values between them are equivalently shown, and among conductor electrodes P of the plurality of conductor electrodes 4 formed on an insulating substrate 6, the magnitude of a resistance value r1 of a resistor 5 positioned between a conductor electrode PF corresponding to the F point equivalent to the full tank and a lower side conductor electrode P1 adjacent to the former is set to be larger than resistance values r2 to re positioned between other lower side conductor electrodes P, and a voltage difference ΔVF between detection voltages VF and V1 of the connection point when the contact portion 7 of the slider 8 constituting the movable contact comes in contact with the conductor electrode PF and the conductor electrode P1 is made not less than 0.4 v (volt) equivalent to the voltage drop due to silver sulfide.

That is, under the power supply voltage V, in the relation among the resistance value RO of the voltage dividing resistance 11, the resistance value r1 between the conductor electrode PF of the F point and the adjacent conductor electrode P1, and a detection resistance rf at the F point (resistance value between the conductor electrode PF equivalent to the F point and an extraction electrode PO), the resistance values are set so that the voltage difference ΔVF between the detection voltages VF and V1 becomes VF=V×((r1+rf)/(r1+rf+RO)−rf/(rf+RO))>=0.4 v.

As a specific example, the power supply voltage V is made V=5 v, the resistance value RO of the voltage dividing resistance 11 is made RO=120 Ω, the detection resistance rf at the F point is made rf=5 Ω, the resistance value r1 between the conductor electrode PF of the F point and the adjacent conductor electrode P1 is made r1=14 Ω, and the resistance values r2 to re between the other lower side conductor electrodes are made r2 to re=2.4 Ω (in this case, the number of the conductor electrodes P is made 52, and the number of r2 to re is 50). By adopting such structure, at a normal time when sulfurization does not occur, the voltage difference ΔVF between the voltage VF of the detection voltage VO of the connection point at the F point and the voltage V1 at the time of contact with the adjacent conductor electrode P1 is ΔVF=5 v×((14 Ω+5 Ω)/(14 Ω+5 Ω+120 Ω)−5 Ω/(5 Ω+120 Ω))=5 v×(14 Ω+5 Ω)/(14 Ω+5 Ω+120 Ω)−5 v×5 Ω/(5 Ω++120 Ω)=0.68 v−0.2 v=0.48 v. Even when the voltage drop of 0.4 v due to contact resistance at the time of sulfurization is generated, the detection voltages added with this voltage drop become 1.08 v and 0.6 v, and the voltage difference ΔVF becomes 0.48 v. Then, the microcomputer 100 as the operation unit generates such indication characteristics that until the detection voltage VO reaches 0.6 v obtained by adding 0.4 v here to the detection voltage 0.2 v of the conductor electrode PF at the F point when sulfurization does not occur, the indication by the pointer P in the indication unit 102 is kept at a position equivalent to the F point on the scale, and the indication according to the detection voltage VO corresponding to the contact position of the contact portion 7 is made after the voltage exceeds 0.6 v. By this, even if sulfurization occurs and the voltage drop 0.4 v is generated, it becomes possible to indicate the F point until the detection voltage 0.6 v including the superimposition of this voltage, and in the case where the contact portion 7 is in contact with the conductor electrode PF equivalent to the full tank by refueling, even if the superimposition of the voltage drop 0.4 v due to sulfurization occurs, an indication error to the lower region does not occur.

Figure 8:
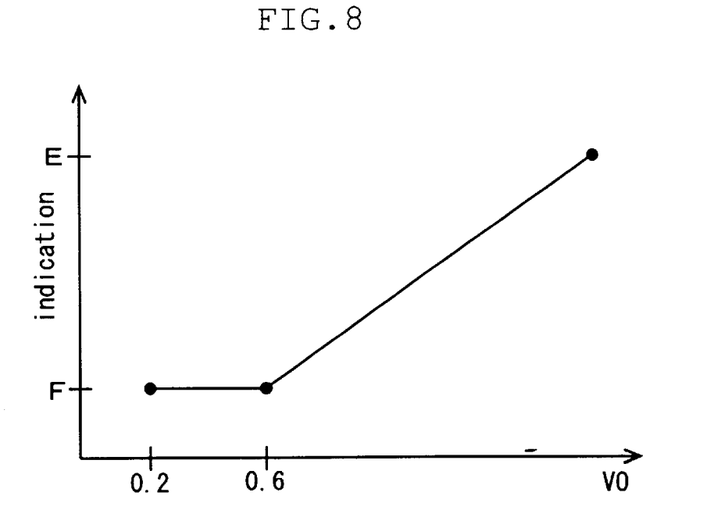
FIG. 8 is a characteristic view showing the relation between a detection voltage by the resistance-type sensor of FIG. 7 and an indication.
Figure 9:
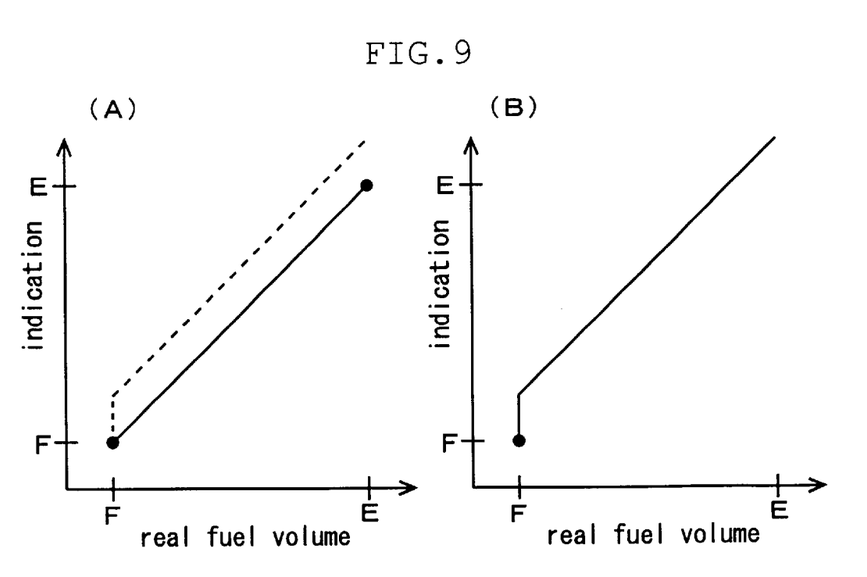
FIG. 9 is a characteristic view showing the relation between a detection position by the resistance-type sensor of FIG. 7 and an indication.

The above indication characteristic will be described with reference to FIGS. 8 and 9. In FIG. 8, in the characteristic of the indication of the pointer P of the indication unit 102 of the Y axis with respect to the detection voltage VO of the X axis, until the detection voltage VO becomes the voltage 0.6 v, the F point is indicated through the microcomputer 100 as the operation unit, and with respect to the contact at the lower side than that, the indication characteristic in accordance with the detection resistance of the resistor 5 is adopted. Thus, as shown in FIG. 9, at the normal time when sulfurization does not occur, the detection voltage VO at the time of contact with the conductor electrode PF of the F point becomes 0.2 v, and since the actual resistance value change is large until the adjacent conductor electrode P1, the detection voltage VO is also largely changed between them as indicated by a broken line, however, since the portion corresponding to the F point on the scale of the indication unit 102 is indicated for the F point indication at the time of the full tank, there is no problem in practical use. Incidentally, in the case where it is desired to make the indication from the F point to the E point linear in the indication characteristic as well, indication characteristic data with respect to the detection voltage VO is correspondingly stored in a memory such as a ROM in the microcomputer 100, and for example, if the indication data is made such that the F point is indicated until the detection voltage VO=0.6 v, and thereafter, a change is made in a unit of an indication angle of one degree correspondingly to a constant voltage change of the detection voltage VO, the linear indication characteristic as shown by a solid line of FIG. 9(A) can also be obtained.

Actually, the shape of a fuel tank is complicatedly changed, and in the liquid level detection by the resistance-type sensor 1, that is, in the system of measuring the height of the liquid surface, the fuel volume in the fuel tank is not faithfully indicated. Thus, as the need arises, according to the shape of the fuel tank, the relation between the height of the liquid surface and the fuel volume corresponding to the height is checked in advance, the indication data corresponding to this relation is stored, and the indication with respect to the detection voltage VO is made, so that the indication more faithful to the fuel volume can also be made.

Accordingly, if the structure is adopted such that detection and indication is made in accordance with the indication characteristic as indicated by the solid line of FIG. 9(A), even if the voltage drop of 0.4 v is generated between contacts by sulfurization, until the detection voltage VO becomes 0.6 v, the F point indication equivalent to 0.2 v is made by the microcomputer 100. At the time of the full tank by refueling, even if sulfurization has occurred, the F point is indicated and the indication error to the lower side by the voltage drop of 0.4 v due to silver sulfide does not occur, so that a driver does not feel distrust. Incidentally, since the indication characteristic at the time of sulfurization is indicated by the indication characteristic of the dashed line of FIG. 9(A), when the voltage exceeds 0.6 v, the conversion indication by the microcomputer 100 comes to correspond to this indication characteristic, and as shown in FIG. 9(B), the indication is shifted to the lower side by the detection voltage VO with the superimposition of 0.4 v due to sulfurization. However, since the F point indication can be carried out without an error, it does not become a problem in practical use.

Besides, in the foregoing embodiment, until the voltage in which 0.4 v is added to the detection voltage VO corresponding to the F point at the normal time when sulfurization does not occur, the F point is indicated so that the error of 0.4 v due to sulfurization does not occur on the indication. This added voltage may be set correspondingly to the voltage drop due to sulfurization, and the characteristic may be set by the microcomputer such that, for example, if the voltage drop due to sulfurization is about 0.6 v, until the voltage in which 0.6 v is added, for example, until the detection voltage VO becomes 0.8 v, the F point is indicated. Experimentally, if 0.4 v or larger is set as stated above, the indication error at the F point due to sulfurization can be removed, and when the voltage difference ΔVF between the conductor electrode PF equivalent to the F point and the adjacent conductor electrode P1 is set to 0.4 v or larger, at least the voltage drop of 0.4 to 0.6 v due to sulfurization at the F point does not have an influence on the indication.

Incidentally, instead of such indication characteristic that the F point is indicated until the voltage in which the influence of the voltage drop due to sulfurization, for example, 0.4 v is added to the detection voltage VO of the F point at the normal time, if a structure is adopted so as to produce such indication characteristic that the F point is indicated by the indication unit 102 until the detection voltage of 0.68 v at the time of sulfurization when contact is made with the conductor electrode P1 adjacent to the conductor electrode PF equivalent to the F point, a similar effect can be obtained. That is, since the resistance values are set so that the voltage difference ΔVF between the conductor electrode PF of the F point and the adjacent conductor electrode P1 becomes 0.68−0.2 =0.48 here, even if sulfurization occurs and the voltage drop of 0.4 v is generated, it becomes possible to indicate the F point until 0.68 v larger than the detection voltage 0.6 v in which this voltage is superimposed. In the case where the contact portion 7 is in contact with the conductor electrode PF equivalent to the full tank by refueling, even if the voltage drop 0.4 v due to sulfurization is generated, it is possible to prevent the indication error to the lower side from occurring. In the foregoing embodiment, the F point is indicated until the voltage in which the predetermined voltage equivalent to the voltage drop due to sulfurization is added to the F point detection voltage VO at the normal time. On the other hand, by this, the F point is indicated until the actual detection voltage VO of the adjacent conductor electrode P1 provided with the voltage difference ΔVF of 0.4 v or larger as the voltage drop or larger due to sulfurization, so that it is possible to facilitate the conversion data setting of the indication characteristic of the pointer P at the change point at the detection voltage VO of the adjacent conductor electrode P1, and as the need arises, such voltage may be adopted.

The specific resistance values in the above embodiment are not limited to these, and although a calculation has been made under the power supply voltage V of 5 v, even in the case where it is 10 v, the object can be achieved by similar condition setting. In the case of the power supply voltage V of 10 v in the structure of the resistance-type sensor 1 explained in FIG. 7, at the normal time when sulfurization does not occur, the voltage difference ΔVF between the voltage VF of the detection voltage VO of the connection point at the F point and the voltage Vi at the contact with the adjacent conductor electrode P1 becomes 10 v×((14 Ω+5 Ω)/(14 Ω+5 Ω+120 Ω)−5 Ω/(5+120 Ω))=10 v×(14 Ω+5 Ω)/(14 Ω+5 Ω+120 Ω)−10 v×5 Ω/(5 Ω+120 Ω)=1.37 v−0.4 v=0.97 v, and it becomes 0.4 v or larger and becomes such magnitude as to able to absorb the voltage drop of 0.4 v at the time of sulfurization, and accordingly, the indication error at the time sulfurization can be similarly suppressed.

Figure 10:
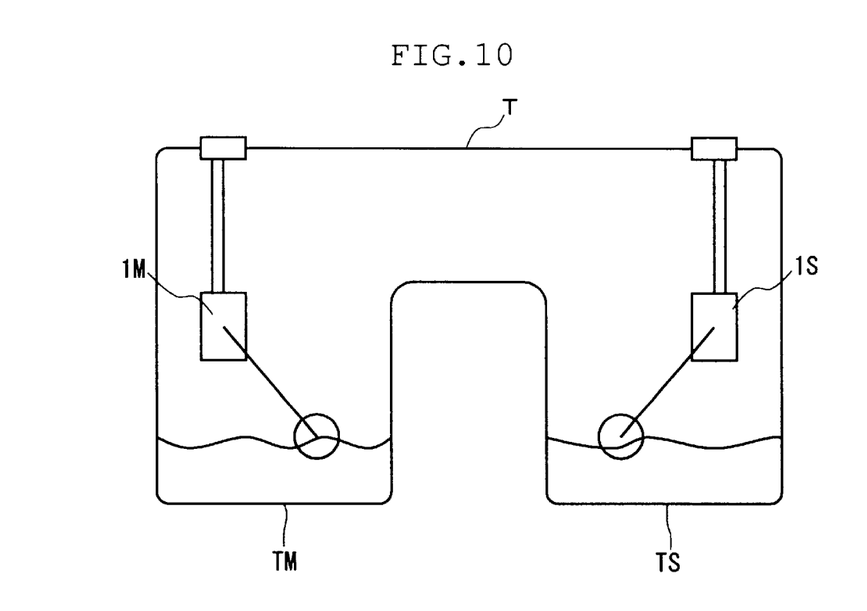
FIG. 10 is a resistance-type sensor installation structural view of a double tank-type liquid level measuring apparatus of the present invention in a tank.
Figure 11:
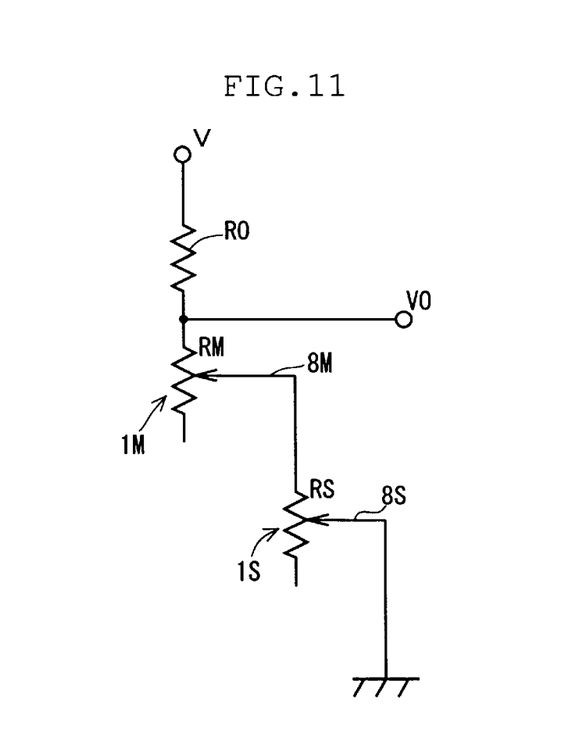
FIG. 11 is a circuit structural view showing a connection relation of the double tank-type liquid level measuring apparatus of FIG. 10.

In FIG. 10, in the case where a saddle-type is adopted as a fuel tank, as in a motorcycle, resistance-type sensors 1M and 1S are provided in a main tank TM and a sub-tank TS of a tank T, respectively, and a residual fuel of the whole tank T by the series connection of both the resistance-type sensors 1M and 1S is detected and displayed. In this case, in a circuit, as shown in FIG. 11, a movable contact 8M of the resistance-type sensor 1M is connected in series with a resistor of the resistance-type sensor 1S of the sub-tank TS, and by this, the detection voltage VO is calculated by addition of resistance values corresponding to respective residual quantities of the resistance-type sensors 1M and 1S of both the tank, and is outputted as VO=V×(RM+RS)/(RO+RM+RS).

Also in this case, if sulfurization occurs at the respective resistance-type sensors 1M and 1S, the voltage drop of 0.4 v is generated at the respective contact portions, and in the detection voltage VO by the series connection of both the sensors 1M and 1S, when sulfurization occurs at both the sensors 1M and 1S, an error of 0.4 v×2=0.8 v occurs in the detection voltage VO of the whole tank. However, in the present invention, typically, the resistance value r1 between the conductor electrodes PF and P1 is set to be large, so that the voltage drop between them becomes 0.4 v or larger. Thus, in the case where the detection voltage VO when the movable contacts 8M and 8S of the respective resistance-type sensors 1M and 1S are in contact with the conductor electrode PF equivalent to the F point is made VO=0.4 v, the indication characteristic of the detection by the microcomputer 100 is set so that the F point is indicated until 0.4 v+0.8 v. As a result, even if sulfurization occurs in both the resistance-type sensors 1M and 1S, the voltage drop due to sulfurization is not reflected to the indication at the F point, and similarly to the indication characteristics explained in FIGS. 8 and 9, the indication error to the lower side does not appear at least at the F point.

Incidentally, the resistance value r1 between the conductor electrodes PF and P1 of the respective resistance-type sensors 1M and 1S is increased to make each voltage drop between them 0.4 v, so that the judgment threshold of the voltage drop of 0.8 v due to sulfurization on the whole is provided. However, in such a tank shape, it is sufficient if 0.8 v is set on the whole, and for example, the voltage drop between the conductor electrodes PF and P1 in the resistance-type sensor 1M is made 0.2 v, and setting is made so that the voltage drop between the conductor electrodes PF and P1 in the resistance-type sensor 1S becomes 0.6 v, and if the voltage drop of 0.8 v is obtained on the whole, the voltage drop of 0.8 v due to sulfurization may be similarly subjected to characteristic processing by the microcomputer 100.

Figure 12:
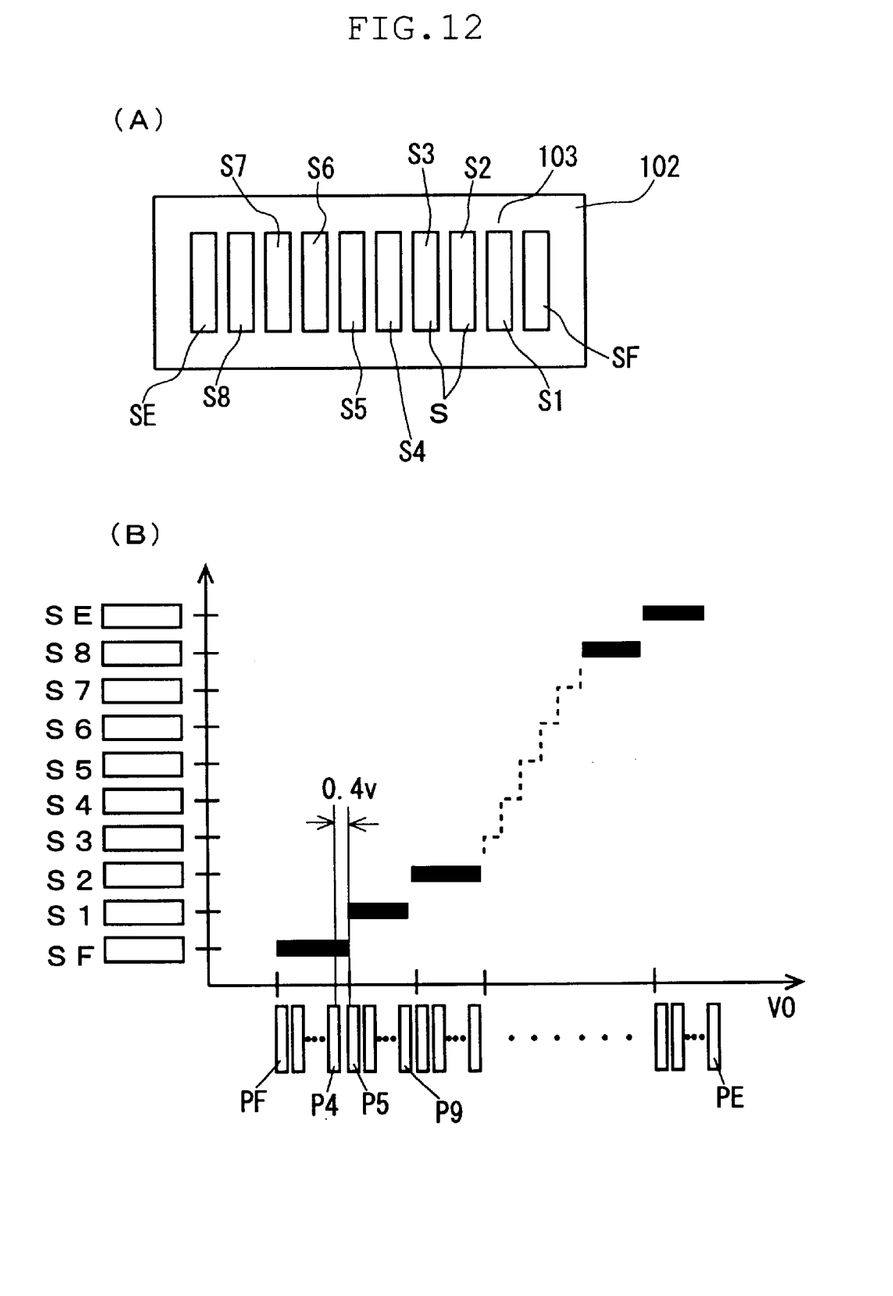
FIG. 12 is a display front view of a bar display-type embodiment of a liquid level measuring apparatus of the present invention and an explanatory view for explaining detection display characteristics.

FIG. 12 shows an embodiment in which an indication unit 102 of the present invention is made an electronic indicator, for example, a liquid crystal indicator, and a liquid level is made a bar display of a plurality of segments. FIG. 12(A) shows an example of the bar display of the indication unit 102, and FIG. 12(B) is a view for explaining the way of producing the indication characteristic for driving the segments S of the bar display in the microcomputer 100.

The indication unit 102 is constructed by a liquid crystal indicator, and the plurality of segments S are driven and controlled on a bar display unit 103, so that the liquid level is indicated by the lighting amount of the segments S. In this case, the number of the segments is made ten, and eight segments S1 to S8 are arranged side by side between an F point segment SF and an E point segment SE.

The structure of the resistance-type sensor 1 is basically the same as that shown in FIGS. 1 and 2, and the relation between the conductor electrode 4 and the resistor is equivalent to that shown in FIG. 7. However, in the conductor electrode structure of this case, if the number of the conductor electrodes is, for example, 50, it is appropriate that five conductor electrodes 4 are made to correspond to each segment S of the ten segments of the bar display unit 103, and a bar display is carried out at a uniform rate. In the structure of the conductor electrode 4 of the resistance-type sensor 1 in such a bar display, mat electrodes the number of which corresponds to that of the respective segments S may be provided, or respective sets of five conductor electrodes 4 may be connected like a comb shape. However, when the conductor electrodes 4 are allocated at a rate equal to the number of the segments, the F point segment SF lights up rather early though the tank is not actually filled up. Thus, in order to make the F point segment SF light up in a region closer to the full tank, it is appropriate that two or three conductor electrodes 4 are made to correspond to the F point segment SF. Besides, the indication characteristic can be easily arbitrarily changed by changing the number of the conductor electrodes 4 corresponding to each of the segments S, or changing the resistance value of the resistor in each region.

In any event, the resistance value r between the conductor electrodes 4 corresponding to a changeover point between the F point segment SF and the lower side segment S1 adjacent thereto is set so that the detection voltage VO becomes 0.4 v or larger between the conductor electrodes. Further, in the microcomputer 100, when the detection voltage VO is detected to carry out the bar display on the bar display unit 103, the F point segment SF lights up until the detection voltage VO=1.1 v in which 0.4 v is added to the detection voltage VF for switching on the F point segment SF (in the structure in which the voltage is changed stepwise in a unit of 0.1 v by the conductor electrodes corresponding to the F point segment SF, for example, five electrodes PF to P4, this voltage corresponds to the voltage at the time of contact with the electrode PF, here, 0.2 v ±0.5 v). With respect to the detection voltage VO larger than that, judgment control is made with a threshold corresponding to a contact position of the conductor electrode 4 corresponding to each segment S. As a result, at the normal time when sulfurization does not occur, a normal display can be enabled in which the F point segment SF lights up from the output as the detection voltage VO=0.7 v, due to the contact with the conductor electrodes PF to P4 corresponding to the F point segment SF, to 1.1 v due to the contact with the conductor electrode P5 corresponding to the adjacent segment Si provided with a voltage difference of 0.4 v. Even if sulfurization is advanced and the voltage drop VS=0.4 v due to the increase of resistance between contacts by the growth of silver sulfide is generated, the F point segment SF can light up until the detection voltage VO=1.1 v at the conductor electrode P4 corresponding to the F point segment SF, and the indication error (extinction of the F point segment SF) to the adjacent segment Si by the voltage drop of 0.4 v due to sulfurization does not occur. If fuel is consumed in this sulfurization state, and the movable contact comes in contact with the conductor electrode P5 corresponding to the adjacent segment Si, the detection voltage VO is 1.1 v 0.4 v=1.5 v and the F point segment SF completely goes out, and even if sulfurization occurs, the F point segment SF can certainly light up at the time of the full tank. Thus, such a disadvantage disappears that an indication error to the lower side due to sulfurization occurs in spite of full tank refueling as in the prior art.

The above indication characteristics are explained in FIG. 12B, in which the X axis indicates conductor electrode lines including the five conductor electrodes PF to P4, and the Y axis indicates the ten segments SF, Si to SE for display, and the lighting relation of the respective segments S at the time of contact with the respective conductor electrodes is shown. The resistance value of a resistor and the resistance value of a voltage dividing resistance are adjusted so that the detection voltage VO by the contact of the movable contact with the conductor electrode becomes 0.2 v at the time of contact with the conductor electrode PF equivalent to the F point, and the voltage drop between the electrodes becomes 0.1 v. As a result, simply, all segments up to the segment SF light up at a voltage of 0.2 v to 0.6 v corresponding to the conductor electrodes PF to P4, and when it becomes 0.7 v corresponding to the conductor electrode P5 or larger, the segment SF goes out. The fuel is further consumed, and the movable contact is changed from 0.7 v -1.1 v corresponding to the conductor electrodes P5 to P9 for switching on the segments up to the segment Si to 1.2 v corresponding to the conductor electrode P10 of a lighting changeover point to the next segment. Thus, the microcomputer 100 carries out the control to switch on and off the segments S in the range of the detection voltage VO. In the case of the present invention, the resistance value is set to be large so that a difference between the detection voltages VO of the conductor electrodes PF to P4 corresponding to the segment SF equivalent to the F point and the conductor electrode P5 corresponding to the adjacent segment Si at the lower side is made 0.4 v or larger, here, 0.4 v. The detection voltage VO is changed from 0.2 v to 0.6 v until the conductor electrodes PF to P4, and when a shift to the conductor electrode P5 is made, the voltage becomes 1.0 v, and subsequently, it rises by a change of 0.1 v between the conductor electrodes. Thus, the microcomputer 100 converts indication characteristics with respect to such input characteristics.

That is, in the microcomputer 100, the detection voltage VO is digitized by A/D conversion and is inputted, and the bar display unit 103 is controlled under such indication characteristics that the segment SF lights up until 0.2 v to 0.6+0.4 v=1.0 v, and from the point exceeding this, the segment sequentially goes out from the segment SF each time there occurs a change of the voltage drop of 0.5 v at the five conductor electrodes corresponding to each of the display segments S. In the case where the conductor electrodes P corresponding to the respective segments S are connected to be united like a comb-like electrode, since the potential at the conductor electrodes is constant, for example, if the detection voltage difference between the F point and the E point is designed to be about 4 v under the power supply voltage of 5 v, voltage differences are generated at intervals of 0.4 v in the conductor electrode group corresponding to the ten segments S. It is assumed that the group of the conductor electrodes PF to P4 corresponding to the segment SF have same potential of 0.2 v, and sequentially, the group of the conductor electrodes P5 to P9 corresponding to the lower segment S1 outputs the detection voltage VO of 0.2 v+0.4 v=0.6 v, and the group of the conductor electrodes P10 to P14 outputs the detection voltage VO of 0.6 v+0.4 v=1.0 v. The microcomputer 100 outputs lighting signals of the segments S previously set correspondingly to the level of this detection voltage VO (the F point segment lights up until 0.6 v). In this case, since the detection voltage difference between the conductor electrode group corresponding to the F point and the conductor electrode group corresponding to the lower segment is made 0.4 v, eventually, a detection voltage difference of 0.4 v or larger equivalent to the voltage drop VS=0.4 v due to silver sulfide in the present invention is secured. By this, even if sulfurization occurs and the voltage drop of 0.4 v at the contact occurs, in the case of the contact with the conductor electrode group corresponding to the F point segment, the F point segment SF certainly lights up. Incidentally, the detection voltage at the conductor electrode group corresponding to the lower side segment S1 is made 0.6 v, and coincides with the detection voltage 0.6 v for switching on the F point segment SF. Thus, the resistance values are actually set so that the detection voltage difference between the conductor electrode group corresponding to the F point segment SF and the conductor electrode group corresponding to the lower segment S1 becomes 0.45 v, and a change of lighting to the lower segment S1 can be made certain.

Accordingly, at the normal time when sulfurization does not occur, accurate indication including the F point can be carried out with respect to the detection voltage VO, and even if the voltage drop VS=0.4 v between contacts is generated by sulfurization, the detection voltage VO at the conductor electrodes PF to P4 corresponding to the F point segment SF is added with the voltage drop 0.4 v by this sulfurization, and is outputted as 0.6 v to 1.0 v. In the microcomputer 100, characteristics are set so that the segment SF lights up until the voltage reaches 1.0 v, and an indication error due to such sulfurization does not occur.

Incidentally, also with respect to the lower side segments S1 to SE lower than the segment SF equivalent to the F point, similarly, 0.4 v due to sulfurization is superimposed and an output is made, and for example, 1.4 v of an output of 1.0 v at the normal time plus 0.4 v is outputted at the time of contact with the adjacent conductor electrode P5. In the microcomputer 100, characteristics are set so that the segments up to the segment S1 light up until the voltage reaches the detection voltage VO=1.0 v to 1.5 v, and thus, the segment S1 goes out at the point when the detection voltage becomes VO=1.5 v at the conductor electrode P6 by the superimposition of the voltage drop of 0.4 v due to sulfurization. However, this detection point does not cause trouble in practical use, and the lighting of the F point segment SF at the time of full tank refueling, which is most important, can be certainly carried out even if sulfurization has occurred, and a driver is not made distrustful.

In the above description, although the addition voltage is made 0.4 v in consideration of the voltage drop due to sulfurization, according to the degree of badness of fuel, a use material of a conductor electrode, an affinity with fuel, a use environment, and the like, a case has been confirmed in which an increase up to about 0.6 v occurs. Thus, according to circumstances, a detection voltage difference between conductor electrodes at a changeover point is set to 0.6 v, and characteristic setting in the operation unit is also made to conform with this, so that similar indication can be carried out, and it would be realistic that with respect to such voltage setting, 0.4 v to 0.6 v is suitably selected and added according to the respective environments.

Finally, in the present invention, although the specific examples have been described using the pointer-type instrument and the bar display, for example, it can also be applied to a rough digital display in a unit of liter. Besides, in the pointer-type instrument, although the F point scale on the dial is made a standard of the full tank region, actually, there is a case where scale characteristics are adopted such that a pointer indicates a place higher than the F point scale at the time of full tank refueling. In such a case, the maximum deflection angle position higher than the F point scale is made an indication position equivalent to a full tank, and a detection voltage difference between the conductor electrode PF corresponding to this indication position and the adjacent conductor electrode P1 may be made 0.4 v or larger, or a structure may be adopted such that a place higher than the F point on the dial is made a position equivalent to a full tank, and a detection voltage difference between the conductor electrode corresponding to the F point scale and the adjacent conductor electrode becomes 0.4 v or larger. The essential thing is that, a structure is adopted such that a difference of a detection voltage VO between an indication position equivalent to a full tank and a conductor electrode adjacent this and positioned at a changeover point for indicating a lower side indication position becomes a voltage drop due to silver sulfide or larger, so that an indication error to a lower side at the time of the full tank does not occur.

Further, even if the indication unit is a pointer-type instrument or an electronic indicator of a bar display or the like, it is possible to adopt both the system in which the detection voltage difference between the conductor electrode equivalent to the F point and the adjacent conductor electrode is made to previously have the voltage drop due to silver sulfide, such as 0.4 v, so that the F point indication error disappears, and the system in which the voltage drop of 0.4 v due to silver sulfide becomes a deflection angle of 15% or less with respect to the deflection angle between the. F point and the E point, which have been described. By adopting both the systems, the accuracy at the F point is raised, and the total error can be made small so that a problem does not arise in practical use. Especially, in the case where the changeover between the F point indication scale and the lower side scale is definite like the bar display, the former system is best, and even if an error occurs at the lower side segment, it does not become a problem in practical use, and the F point segment can certainly light up at the time of the full tank even at the time of sulfurization.

In the pointer-type instrument, the deflection angle of the fuel gauge scale is as narrow as 90 degrees, and it is sufficient if a rough residual quantity state can be grasped. Thus, when the latter system in which the influence of the voltage drop due to silver sulfide, such as 0.4 v, on the deflection angle becomes 15% or less is adopted, the accuracy adequate for practical use can be obtained, and even if sulfurization occurs, the indication of the full tank region higher than the F point scale can be made stable. However, in the case where it is desired to make the F point indication more accurate without an error, it is appropriate that the former system is adopted.

POSSIBILITY OF INDUSTRIAL USE

As described above, the resistance-type liquid level measuring apparatus of the present invention is especially effective for a liquid level measuring apparatus in which an Ag (silver) component of an electrode or a contact is sulfurized by sulfur in fuel, and silver sulfide is deposited on the electrode or the contact surface.

What is claimed is:

1. A resistance-type liquid level measuring apparatus installed in a fuel tank, for detecting a fuel quantity in the tank, comprising a resistance-type sensor including a float floating according to a liquid level, an insulating substrate having a plurality of conductor electrodes connected with a resistor, and a movable contact interlocked with a movement of the float to come in contact with the conductor electrodes on the insulating substrate, wherein a material containing silver is used as a material of the conductor electrodes or the movable contact, and a voltage dividing resistance is connected with a power source in series with the resistor, and a voltage of a connection point between the voltage dividing resistance and the resistor is outputted as a signal corresponding to the liquid level, characterized in that resistance values of the voltage dividing resistance and the resistor are set so that a voltage drop VS due to silver sulfide generated between the conductor electrode and the movable contact is less than or equal to 15% with respect to a difference between a voltage VF equivalent to a full tank of the liquid level and a voltage VE equivalent to a low region.

2. A resistance-type liquid level measuring apparatus installed in a fuel tank, for detecting a fuel quantity in the tank, comprising a resistance-type sensor including a float floating according to a liquid level, an insulating substrate having a plurality of conductor electrodes connected with a resistor, and a movable contact interlocked with a movement of the float to come in contact with the conductor electrodes on the insulating substrate, wherein a material containing silver is used as a material of the conductor electrodes or the movable contact, and a voltage dividing resistance is connected with a power source in series with the resistor, and a voltage of a connection point between the voltage dividing resistance and the resistor is outputted as a signal corresponding to the liquid level, characterized in that as a detection voltage VO outputted to the connection point, at a position of the movable contact, when a voltage equivalent to a full tank of the liquid level is VF, a voltage equivalent to a low region is yE, and a power supply voltage V is V=10 to 16 v (volt), a resistance value RO of the voltage dividing resistance, a resistance value RE of the resistor equivalent to the low region of the liquid level, and a resistance value RF equivalent to a full tank are set so that VF -VE > 4 v (volt).

3. A resistance-type liquid level measuring apparatus installed in a fuel tank, for detecting a fuel quantity in the tank, comprising a resistance-type sensor including a float floating according to a liquid level, an insulating substrate having a plurality of conductor electrodes connected with a resistor, and a movable contact interlocked with a movement of the float to come in contact with the conductor electrodes on the insulating substrate, wherein a material containing silver is used as a material of the conductor electrodes or the movable contact, and a voltage dividing resistance is connected with a power source in series with the resistor, and a voltage of a connection point between the voltage dividing resistance and the resistor is outputted as a signal corresponding to the liquid level, characterized in that as a detection voltage VO outputted to the connection point, at a position of the movable contact, when a voltage equivalent to a full tank of the liquid level is VF, a voltage equivalent to a low region is VE, and a power supply voltage is V, a resistance value RO >=300 Ω of the voltage dividing resistance, a resistance value RE >=300 Ω of the resistor equivalent to the low region of the liquid level, and a resistance value RF=< RE ×0.1 equivalent to a full tank are set so that VF - VE > 4 v (volt).

4. A resistance-type liquid level measuring apparatus according to claim 1, characterized in that as the material of the movable contact, an alloy containing copper and nickel, or an alloy containing copper, nickel, and zinc is used.

5. A resistance-type liquid level measuring apparatus according to claim 1, characterized in that the power supply voltage V is made 10 to 16 v, the resistance value of the voltage dividing resistance RO is made 350 to 450 Ω, the resistance value RE of the resistor equivalent to the low region of the liquid level is made 400 to 500 Ω, and the resistance value RE equivalent to the full tank is set within a range of 10 to 20 Ω.

6. A resistance-type liquid level measuring apparatus according to claim 1, characterized by comprising an operation unit to which the detection voltage VO of the connection point is inputted, and which detects the liquid level by a ratio with respect to the power supply voltage V, and an indication unit for indicating the detected liquid level by an output of this operation unit.

7. A resistance-type liquid level measuring apparatus installed in a fuel tank, for detecting a fuel quantity in the tank, comprising a resistance-type sensor including a float floating according to a liquid level, an insulating substrate having a plurality of conductor electrodes connected with a resistor, and a movable contact interlocked with a movement of the float to come in contact with the conductor electrodes on the insulating substrate, wherein a material containing silver is used as a material of the conductor electrodes or the movable contact, and a voltage dividing resistance is connected with a power source in series with the resistor, and a voltage of a connection point between the voltage dividing resistance and the resistor is outputted as a signal corresponding to the liquid level, characterized in that a resistance value of the resistor positioned between a conductor electrode PF among the conductor electrodes, with which the movable contact comes in contact at a full tank of the liquid level, and a lower side conductor electrode P1 adjacent to this is set to be larger than a resistance value between the other conductor electrodes P positioned at the lower side, and a voltage difference (VF between detection voltages VF and V1 at the connection point when the movable contact comes in contact with the conductor electrode PF and the conductor electrode P1 becomes 0.4 v (volt) or larger.

8. A resistance-type liquid level measuring apparatus installed in a fuel tank, for detecting a fuel quantity in the tank, comprising resistance-type sensors each including a float floating according to a liquid level, an insulating substrate having a plurality of conductor electrodes connected with a resistor, and a movable contact interlocked with a movement of the float to come in contact with the conductor electrodes on the insulating substrate, wherein the resistance-type sensors are installed in a main tank and a sub-tank of the fuel tank, and an output end of the movable contact of one of them is connected to the conductor electrode of the other so that the resistors of the respective resistance-type sensors are connected in series with a power source, a material containing silver is used as a material of the conductor electrodes or the movable contact, and a voltage dividing resistance is connected with the power source in series with the resistor of the one, and a voltage of a connection point between the voltage dividing resistance and the resistor is outputted as a signal corresponding to the liquid level, characterized in that a resistance value of the resistor positioned between a conductor electrode PF among the conductor electrodes, with which the movable contact comes in contact at a full tank of the liquid level, and a lower side conductor electrode P1 adjacent to this is set to be larger than a resistance value between the other conductor electrodes P positioned at the lower side, and the sum of voltage differences (VF respectively between detection voltages VF and VI at the connection point when the movable contact comes in contact with the conductor electrode PF and the conductor electrode P1 becomes 0.8 v (volt) or larger.

9. A resistance-type liquid level measuring apparatus according to claim 7, characterized by comprising an operation unit to which a detection voltage VO of the connection point is inputted, and which detects the liquid level by a ratio with respect to a power supply voltage V, and an indication unit for indicating the detected liquid level by an output of the operation unit, wherein the operation unit generates such an indication characteristic that F point indication equivalent to a full tank in the indication unit is carried out until the detection voltage VO becomes a voltage obtained by adding 0.4 v (volt) or larger, or 0.8 v (volt) or larger to the detection voltage VF at the conductor electrode PF at a normal time when sulfurization does not occur.

10. A resistance-type liquid level measuring apparatus according to claim 7, characterized by comprising an operation unit to which a detection voltage VO of the connection point is inputted, and which detects the liquid level by a ratio with respect to a power supply voltage V, and an indication unit for indicating the detected liquid level by an output of the operation unit, wherein the operation unit generates such an indication characteristic that F point indication equivalent to a full tank in the indication unit is carried out until the detection voltage VI of the resistance-type sensor at the connection point when the movable contact comes in contact with the conductor electrode P1 adjacent to the conductor electrode PF or a voltage of the sum of the detection voltages V1.

11. A resistance-type liquid level measuring apparatus according to claim 7, characterized in that resistance values of the voltage dividing resistance and the resistor are set so that a voltage drop VS due to silver sulfide generated between the conductor electrode and the movable contact becomes 15% or less, preferably 10% or less with respect to a difference between a voltage VF equivalent to a full tank of the liquid level and a voltage VE equivalent to a low region.

12. A resistance-type liquid level measuring apparatus installed in a fuel tank, for detecting a fuel quantity in the tank, comprising a resistance-type sensor including a float floating according to a liquid level, an insulating substrate having a plurality of conductor electrodes connected with a resistor, and a movable contact interlocked with a movement of the float to come in contact with the conductor electrodes on the insulating substrate, wherein a material containing silver is used as a material of the conductor electrodes or the movable contact, a voltage dividing resistance is connected with a power source in series with the resistor, and a voltage of a connection point between the voltage dividing resistance and the resistor is outputted as a signal corresponding to the liquid level, and the apparatus further comprises an operation unit to which a detection voltage VO of the connection point is inputted, and which detects the liquid level by the detection voltage VO, and an indication unit for indicating the detected liquid level by an output of this operation unit, characterized in that the indication unit is constituted by a bar display made of a plurality of segments according to an electronic indicator and, a difference of the detection voltage VO between the conductor electrodes of the resistance-type sensor positioned at an indication segment equivalent to a full tank and a changeover point for driving a lower side segment adjacent thereto is set to 0.4 v (volt) or larger.

13. A resistance-type liquid level measuring apparatus installed in a fuel tank, for detecting a fuel quantity in the tank, comprising a resistance-type sensor including a float floating according to a liquid level, an insulating substrate having a plurality of conductor electrodes connected with a resistor, and a movable contact interlocked with a movement of the float to come in contact with the conductor electrodes on the insulating substrate, wherein a material containing silver is used as a material of the conductor electrodes or the movable contact, a voltage dividing resistance is connected with a power source in series with the resistor, and a voltage of a connection point between the voltage dividing resistance and the resistor is outputted as a signal corresponding to the liquid level, and the apparatus further comprises an operation unit to which a detection voltage VO of the connection point is inputted, and which detects the liquid level by the detection voltage VO, and an indication unit for indicating the detected liquid level by an output of this operation unit, characterized in that the indication unit is configured so that a difference of the detection voltage VO between the conductor electrodes of the resistance-type sensor positioned at an indication position equivalent to a full tank and a changeover point for driving a lower side position adjacent thereto is equal to or larger than a voltage drop due to silver sulfide when the silver sulfide is generated.

14. A resistance-type liquid level measuring apparatus as recited in claim 1, wherein said resistance values of the voltage dividing resistance and the resistor are set so that a voltage drop VS due to silver sulfide generated between the conductor electrode and the movable contact is less than or equal to 10% with respect to a difference between a voltage VF equivalent to a full tank of the liquid level and a voltage VE equivalent to a low region.

* * * * *